(12) United States Patent
Qiao et al.

(10) Patent No.: US 11,416,485 B2
(45) Date of Patent: Aug. 16, 2022

(54) DYNAMIC QUERY EXPRESSIONS

(71) Applicant: SAP SE, Walldorf (DE)

(72) Inventors: Zhi Qiao, Shanghai (CN); Stefan Baeuerle, Rauenberg (DE); Ki Hong Kim, Seoul (KR); Florian Scheid, Wiesloch (DE); Timm Falter, Sinsheim (DE); Andreas Balzar, Heidelberg (DE); Di Wu, Shanghai (CN)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 16/368,448

(22) Filed: Mar. 28, 2019

(65) Prior Publication Data

US 2020/0311078 A1 Oct. 1, 2020

(51) Int. Cl.
*G06F 16/2453* (2019.01)
*G06F 9/54* (2006.01)
*G06F 16/22* (2019.01)

(52) U.S. Cl.
CPC .......... *G06F 16/24542* (2019.01); *G06F 9/54* (2013.01); *G06F 16/2228* (2019.01)

(58) Field of Classification Search
CPC .. G06F 16/24542; G06F 16/2228; G06F 9/54; G06F 16/245; G06F 16/2452
See application file for complete search history.

(56) References Cited

U.S. PATENT DOCUMENTS

| | | | |
|---|---|---|---|
| 7,065,537 B2 | 6/2006 | Cha et al. | |
| 7,487,513 B1 | 2/2009 | Savchenko et al. | |
| 7,496,624 B2 | 2/2009 | Falter et al. | |
| 7,606,818 B2 | 10/2009 | Bachmann et al. | |
| 7,620,934 B2 | 11/2009 | Fak | |
| 7,689,646 B2 | 3/2010 | Bachmann et al. | |
| 7,694,140 B1 | 4/2010 | Savchenko et al. | |
| 7,739,387 B2 | 6/2010 | Eberlein et al. | |
| 7,783,717 B1 | 8/2010 | Savchenko et al. | |
| 7,788,319 B2 | 8/2010 | Schmidt et al. | |
| 7,822,826 B1 | 10/2010 | Savchenko et al. | |
| 7,844,659 B2 | 11/2010 | Baeuerle et al. | |
| 7,934,219 B2 | 4/2011 | Baeuerle et al. | |
| 7,971,209 B2 | 6/2011 | Eberlein et al. | |
| 8,392,573 B2 | 3/2013 | Lehr et al. | |
| 8,413,150 B2 | 4/2013 | Lu et al. | |
| 8,504,980 B1 | 8/2013 | Kraft et al. | |
| 8,661,432 B2 | 2/2014 | Kriebel et al. | |
| 8,751,437 B2 | 6/2014 | Teichmann et al. | |
| 8,819,075 B2 | 8/2014 | Schlarb et al. | |

(Continued)

OTHER PUBLICATIONS

U.S. Appl. No. 10/954,904, filed Sep. 30, 2004, Brunswig et al.
U.S. Appl. No. 11/097,107, filed Mar. 31, 2005, Schmidt et al.

*Primary Examiner* — Ashish Thomas
*Assistant Examiner* — Dustin D Eyers
(74) *Attorney, Agent, or Firm* — Fish & Richardson P.C.

(57) ABSTRACT

Implementations of the present disclosure include receiving a query, the query including an expression macro (EM), processing the query to provide a raw parse tree, the raw parse tree including an initial node representative of the EM, retrieving metadata corresponding to the EM, the metadata including a definition string, replacing the initial node with a node based on the definition string to provide a consumable parse tree, and executing the query within the database system using the consumable parse tree to provide a query result.

20 Claims, 5 Drawing Sheets

(56) References Cited

U.S. PATENT DOCUMENTS

| | | |
|---|---|---|
| 8,892,667 B2 | 11/2014 | Brunswig et al. |
| 8,949,789 B2 | 2/2015 | Schlarb et al. |
| 9,021,019 B2 | 4/2015 | Krannich et al. |
| 9,299,049 B2 | 3/2016 | Stallman et al. |
| 9,442,977 B2 | 9/2016 | Falter et al. |
| 2004/0117435 A1 | 6/2004 | Rossmanith et al. |
| 2004/0254945 A1 | 12/2004 | Schmidt et al. |
| 2005/0021543 A1 | 1/2005 | Schmitt et al. |
| 2005/0027675 A1 | 2/2005 | Schmitt et al. |
| 2006/0004700 A1 | 1/2006 | Hofmann et al. |
| 2006/0031850 A1 | 2/2006 | Falter et al. |
| 2006/0070083 A1 | 3/2006 | Brunswig et al. |
| 2006/0224702 A1 | 10/2006 | Schmidt et al. |
| 2007/0233754 A1 | 10/2007 | Baeuerle et al. |
| 2008/0033989 A1 | 2/2008 | Cha et al. |
| 2008/0059517 A1 | 3/2008 | Glania et al. |
| 2008/0075246 A1 | 3/2008 | Glania et al. |
| 2008/0077549 A1 | 3/2008 | Glania et al. |
| 2008/0114626 A1 | 5/2008 | Baeuerle et al. |
| 2008/0114627 A1 | 5/2008 | Baeuerle et al. |
| 2008/0126409 A1 | 5/2008 | Weber et al. |
| 2008/0291908 A1 | 11/2008 | Bachmann et al. |
| 2008/0294757 A1 | 11/2008 | Bachmann et al. |
| 2009/0055345 A1 | 2/2009 | Mehta et al. |
| 2009/0070165 A1 | 3/2009 | Baeuerle et al. |
| 2009/0070330 A1 | 3/2009 | Hwang et al. |
| 2009/0089109 A1 | 4/2009 | Rabetge et al. |
| 2009/0100053 A1* | 4/2009 | Boschee ............... G06F 16/334 |
| 2009/0125612 A1 | 5/2009 | Rabetge et al. |
| 2009/0150900 A1 | 6/2009 | Kowalkiewicz et al. |
| 2009/0164996 A1 | 6/2009 | Baeuerle et al. |
| 2009/0165001 A1 | 6/2009 | Baeuerle et al. |
| 2009/0281777 A1 | 11/2009 | Baeuerle et al. |
| 2010/0023339 A1 | 1/2010 | Baeuerle et al. |
| 2010/0057468 A1* | 3/2010 | Lin ........................ G06F 40/14 |
| | | 704/275 |
| 2010/0057771 A1 | 3/2010 | Baeuerle et al. |
| 2010/0057776 A1 | 3/2010 | Baeuerle et al. |
| 2010/0161648 A1 | 6/2010 | Eberlein et al. |
| 2010/0161675 A1 | 6/2010 | Ritter et al. |
| 2010/0162147 A1 | 6/2010 | Ritter et al. |
| 2011/0029983 A1 | 2/2011 | Lu et al. |
| 2011/0145255 A1 | 6/2011 | Kim et al. |
| 2011/0154253 A1 | 6/2011 | Lehr et al. |
| 2011/0246991 A1 | 10/2011 | Lu et al. |
| 2012/0005179 A1 | 1/2012 | Thimmel et al. |
| 2012/0016910 A1 | 1/2012 | Schlarb et al. |
| 2012/0023445 A1 | 1/2012 | Baeuerle et al. |
| 2012/0030580 A1 | 2/2012 | Schlarb et al. |
| 2012/0030581 A1 | 2/2012 | Cui et al. |
| 2012/0158556 A1 | 6/2012 | Said et al. |
| 2012/0166928 A1 | 6/2012 | Stern et al. |
| 2013/0014080 A1 | 1/2013 | Brunswig et al. |
| 2013/0046894 A1 | 2/2013 | Said et al. |
| 2013/0151534 A1* | 6/2013 | Luks ....................... G06F 16/71 |
| | | 707/742 |
| 2014/0019934 A1 | 1/2014 | Schlarb et al. |
| 2014/0026114 A1 | 1/2014 | Schlarb et al. |
| 2014/0053133 A1 | 2/2014 | Schlarb et al. |
| 2014/0082415 A1 | 3/2014 | Schlarb et al. |
| 2014/0181322 A1 | 6/2014 | Schmitt et al. |
| 2014/0279839 A1 | 9/2014 | Balzar et al. |
| 2015/0006730 A1 | 1/2015 | Helfman et al. |
| 2015/0074069 A1 | 3/2015 | Baeuerle et al. |
| 2015/0074081 A1 | 3/2015 | Falter et al. |
| 2015/0074083 A1 | 3/2015 | Hutzel et al. |
| 2015/0074136 A1 | 3/2015 | Falter et al. |
| 2015/0074140 A1 | 3/2015 | Hutzel et al. |
| 2015/0074685 A1 | 3/2015 | Baeuerle et al. |
| 2015/0074686 A1 | 3/2015 | Baeuerle et al. |
| 2015/0149442 A1 | 5/2015 | Kim et al. |
| 2015/0161182 A1 | 6/2015 | Baeuerle et al. |
| 2015/0188978 A1* | 7/2015 | Petculescu ............. H04L 67/02 |
| | | 709/217 |
| 2015/0293947 A1 | 10/2015 | Bhagavan et al. |
| 2015/0347410 A1 | 12/2015 | Kim et al. |
| 2015/0370853 A1 | 12/2015 | Lee et al. |
| 2016/0063378 A1 | 3/2016 | Park et al. |
| 2016/0125009 A1 | 5/2016 | Wu et al. |
| 2016/0321307 A1* | 11/2016 | Dingman ............... G06F 16/25 |
| 2017/0147311 A1 | 5/2017 | Bregler et al. |
| 2017/0147639 A1 | 5/2017 | Lee et al. |
| 2017/0147645 A1 | 5/2017 | Song et al. |
| 2017/0147671 A1 | 5/2017 | Bensberg et al. |
| 2017/0228351 A1* | 8/2017 | Zhang .................... H04L 67/02 |
| 2017/0322972 A1 | 11/2017 | Lee et al. |
| 2018/0018368 A1 | 1/2018 | Baeuerle et al. |
| 2018/0121326 A1 | 5/2018 | Qi et al. |
| 2018/0165610 A1* | 6/2018 | Dumant ................. G06F 40/47 |
| 2018/0253473 A1 | 9/2018 | Ziegler et al. |
| 2018/0293276 A1 | 10/2018 | Bae et al. |
| 2018/0329963 A1 | 11/2018 | Voutta et al. |
| 2018/0336245 A1 | 11/2018 | Wu et al. |
| 2018/0373757 A1 | 12/2018 | Schukovets et al. |
| 2019/0042632 A1 | 2/2019 | Krause et al. |

\* cited by examiner

DYNAMIC QUERY EXPRESSIONS

BACKGROUND

Database systems store data that can be queried. For example, a query can be submitted to a database system, which processes the query and provides a result. Queries are submitted in a query language. An example query language includes, without limitation, the structured query language (SQL), which can be described as a standard database language that is used to create, maintain and retrieve data stored in a relational database (e.g., a database, in which data is stored in relational tables). Query languages, such as SQL, however, can have limitations that result in resource-inefficient processing of queries, and/or reduced accuracy of results. For example, SQL enables processing of calculations and aggregations close to the data. However, the calculation is first executed and then the aggregation. This has an adverse impact on performance (e.g., in terms of processing power required, and time to process), because calculations are executed row by row. The more complicated the calculations are, the bigger the impact is.

SUMMARY

Implementations of the present disclosure include computer-implemented methods for querying a database system. More particularly, implementations of the present disclosure are directed to providing expressions macros (EMs) within queries to enable flexibility in orders of operation (e.g., aggregate then calculate).

In some implementations, actions include receiving a query, the query including an expression macro (EM), processing the query to provide a raw parse tree, the raw parse tree including an initial node representative of the EM, retrieving metadata corresponding to the EM, the metadata including a definition string, replacing the initial node with a node based on the definition string to provide a consumable parse tree, and executing the query within the database system using the consumable parse tree to provide a query result. Other implementations include corresponding systems, apparatus, and computer programs, configured to perform the actions of the methods, encoded on computer storage devices.

These and other implementations may each optionally include one or more of the following features: processing the query to provide a raw parse tree includes parsing the query by a parser, the parser including an EM syntax that enables the parser to generate the initial node as a data structure to represent the EM provided within the query; the metadata is retrieved from a metadata store through an application programming interface (API) based on a request including a view name and a view schema name; a preprocessor receives the raw parse tree from a parser and replaces the initial node with the node to provide the consumable parse tree; the metadata is generated during a data definition language (DDL) phase and is stored in a persistence layer of the database system; the EM includes at least one nested EM, the nested EM being represented by another initial node within the raw parse tree, the another initial node being replaced be another node based on a definition of the nested EM provided from metadata; and executing the query includes executing a query execution plan that is provided based on the consumable parse tree.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
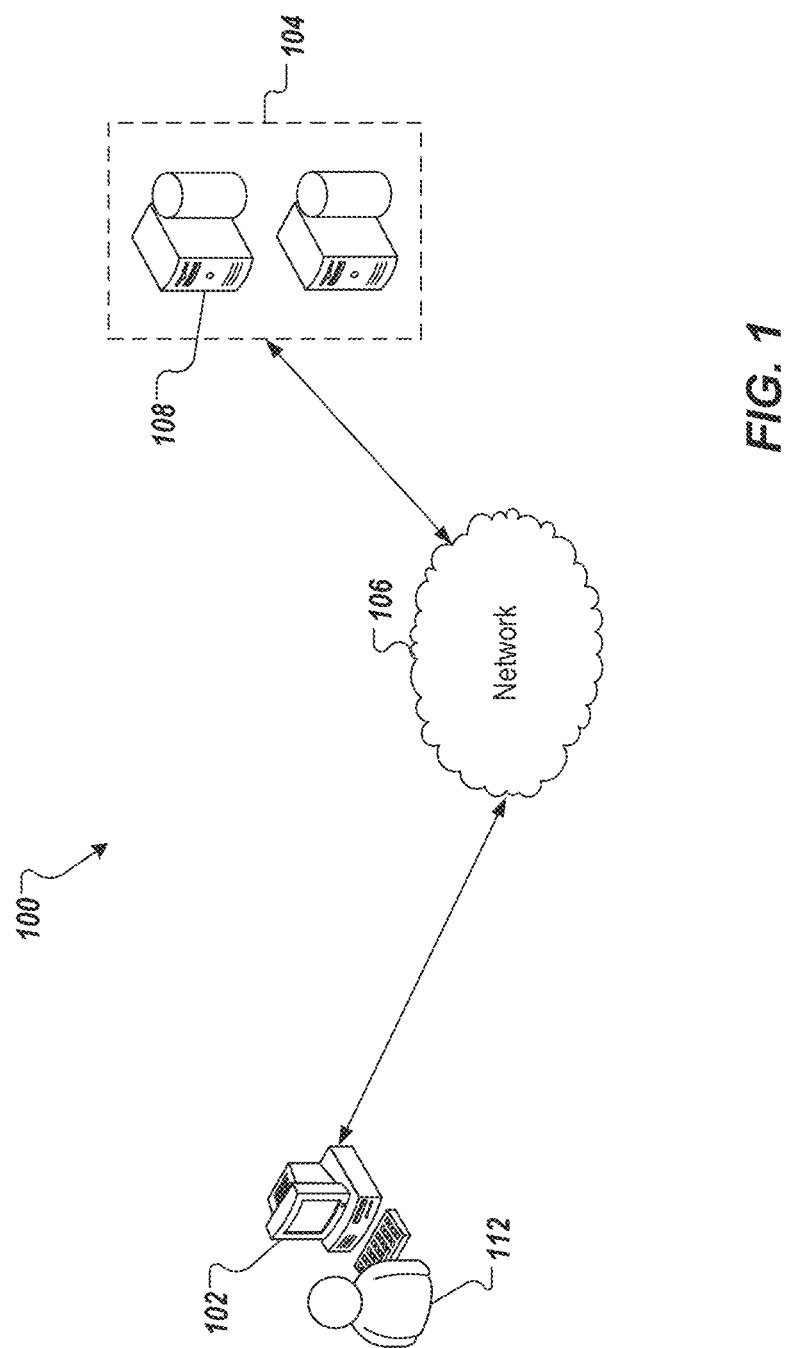
FIG. 1 depicts an example environment that can be used to execute implementations of the present disclosure.

Implementations of the present disclosure include computer-implemented methods for querying a database system. More particularly, implementations of the present disclosure are directed to providing expressions macros (EMs) within queries to enable flexibility in orders of operation (e.g., aggregate then calculate). In some implementations, actions include receiving a query, the query including an expression macro (EM), processing the query to provide a raw parse tree, the raw parse tree comprising an initial node representative of the EM, retrieving metadata corresponding to the EM, the metadata including a definition string, replacing the initial node with a node based on the definition string to provide a consumable parse tree, and executing the query within the database system using the consumable parse tree to provide a query result.

Implementations of the present disclosure are described in further detail with reference to an example query language. The example query language includes the structured query language (SQL) as the language that is used to query the database system. It is contemplated, however, that implementations of the present disclosure can be realized with any appropriate query language.

To provide further context for implementations of the present disclosure, and as introduced above, database systems store data that can be queried. For example, a query can be submitted to a database system, which processes the query and provides a result. Queries are submitted in a query language, such as SQL. Query languages, such as SQL, however, can have limitations that result in resource-inefficient processing of queries, and/or reduced accuracy of the results. For example, SQL enables processing of calculations and aggregations close to the data. However, the calculation is first executed and then the aggregation. This has an adverse impact on performance (e.g., in terms of processing power required, and time to process), because calculations are executed row by row. The more complicated the calculations are, the bigger the impact is.

By way of non-limiting example, data within rows of the database can represent different currencies. For a query that requires a common currency, a currency conversion calculation is executed on every row. That is, the data is converted across every row to a target currency. Data is then aggregated to provide aggregated data in the target currenc(y/ies). However, to provide the result, it may not be required to execute the currency calculation across all rows. For example, the number of rows can be in the millions, while the number of rows that are relevant to the query can be in the thousands. In this example, executing the calculation over all rows results in a significant amount of resources (e.g., processors, memory), as opposed to calculation over aggregated rows, and takes longer. Further, as currency conversion can require rounding, rounding errors across millions of rows is greater than that across thousands of rows.

As another example, calculation after aggregation is a relatively common query processing model in some analytics engines (e.g., online analytical processing (OLAP) engines). An analytics engine is typically provided as a layer on top of the database system, which itself is implemented in an application server. In some examples, the analytics engine executes a request in following order: retrieve data from database, execute standard aggregation over the data to provide an aggregation result, and process formulae/calculations on the aggregation result to provide a result. At least one drawback of this model in an analytics engine is that the processing logic (both aggregation and calculation) is carried out in the analytics engine, as opposed to in the database. Consequently, all of the data that is to be processed is fetched from the database into the analytics engine. However, because the data is stored in a different location, additional resources are expended to retrieve and transform the data for processing.

In view of this, and as described in further detail herein, implementations of the present disclosure provide an extension to a query language to enable aggregation over rows and subsequent execution of calculations on aggregated rows. For example, and referencing the currency example above, instead of currency conversions on every row, different records of given base currencies are aggregated, and currency conversion is done on the aggregated values into a target currency. The converted, aggregated rows are aggregated again (e.g., as a (single value) result). To achieve this, implementations of the present disclosure provide a syntax included in a query parser and a query rewriting rule in a query preprocessor. As described in further detail herein, implementations of the present disclosure transform a raw query (raw query tree) produced by the parser, and verify semantic meaning using metadata. Implementations of the present disclosure provide a variable, referred to herein as an expression macro (EM), that is used to improve performance of query execution. More particularly, the EM is used to first aggregate and then calculate. Further, implementations of the present disclosure enable operations to be handled within the database.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a database system. In some examples, the database system is a database management system (DBMS) that stores data in relational tables (e.g., as a relational database). In some implementations, the database system processes queries that include one or more EMs, as described herein, to provide one or more results in a time- and resource-efficient manner.

As introduced above, implementations of the present disclosure provide the EM, which enables dynamic query processing, and data aggregation prior to calculation in queries submitted to a database system. In some implementations, the EM can be described as a mechanism that enables a predefined formula to calculate and aggregate on columns of tables within the database system. In some implementations, a query is received and includes one or more EMs. The query is processed by a query parser that parses the query string into a raw parse tree. The query parser includes an EM syntax in accordance with implementations of the present disclosure, and which is described in further detail herein. The query parser executes one or more query rewriting rules to provide the raw parse tree. A query preprocessor receives the raw parse tree and transforms the raw parse tree to a consumable parse tree. In some implementations, and as described herein, the preprocessor identifies one or more instances of the EM in the raw parse tree, and, for each instance, generates a consumable node based on metadata and replaces an EM node of the raw parse tree with the consumable node. In some implementations, a query checker processes the consumable parse tree to verify the semantic meaning of the query. The query checker blocks invalid usage of Ems by throwing exceptions to the client. Upon verifying the semantic meaning, the consumable parse tree is processed within the database system to provide a result.

In accordance with implementations of the present disclosure, and as introduced above, a EM syntax is provided as part of a data definition language (DDL) within the query parser. In some implementations, the EM syntax enables the parser to generate a data structure to represent an EM clause provided within the query. An example EM clause includes WITH EXPRESSION MACROS. In some implementations, the EM syntax includes a create statement, an alter statement, and a select statement. An example create statement is provided as:

```
<create view> ::= CREATE VIEW <table_ref> AS <select_stmt>
[<expression_macros>]
<expression_macros> ::= WITH EXPRESSION MACROS (
<expression_macro_list> )
<expression_macro_list> ::= <expression_macro_list>,
<expression_macro>
<expression_macro> ::= <expr> AS <expression_macro_name>
<expression_macro_name> ::= <identifier>
```

An example alter statement is provided as:

```
<alter view> ::= ALTER VIEW ADD EXPRESSION MACROS (
<expression_macro_list> )
<alter view> ::= ALTER VIEW DROP EXPRESSION MACROS (
<expression_macro_name_list> )
<expression_macro_name_list> ::= <expression_macro_name_list>,
<expression_macro_name>
```

An example select statement is provided as:

```
Built-in function EXPRESSION_MACRO(<expression_macro_name>)
```

Implementations of the present disclosure further provide metadata that is stored in a persistence layer. In some implementations, the metadata provides a definition for the EM, as described in further detail herein.

Implementations of the present disclosure also provide a rewriting rule for the preprocessor. In some implementations, the rewriting rule is provided as a rewriting function EXPRESSION_MACRO("expr_macro") to rewrite using the definition expression of "expr_macro" provided in the metadata. The definition is able to be consumed by backend components. The rewriting is on parse tree modification, not on query string modification. That is, and as described in further detail herein, the raw parse tree is rewritten to provide the consumable parse tree.

In accordance with implementations of the present disclosure, the EM introduces a collection of special columns into a view. Each special column stands for one kind of algorithm to calculate and aggregate. The special column is different from a common column in referencing. An EM column is referenced by a function EXPRESSION_MACRO, otherwise it is treated as an error of column not found. However, there can be a common column that has the same name as the expression macro column. For example, if the EXPRESSION_MACRO function is not used, the common column is referenced.

To illustrate implementations of the present disclosure, a non-limiting example is provided. In this example, a data model is provided and is named Orders. The data model contains CustomerID, Revenue, Cost and CreateTime. In SQL, this data model can be depicted as a SQL Table. For example:

```
CREATE TABLE Orders (CustomerID INTEGER, Revenue
INTEGER, Cost INTEGER, CreateTime TIMESTAMP)
A SQL EM can be used to calculate a Profit Rate as:
CREATE VIEW OrdersView AS SELECT * FROM Orders
WITH EXPRESSION MACROS((SUM(Revenue) –
SUM(Cost)) / SUM(Cost) AS ProfitRate)
```

An expected result is obtained by executing:

```
CREATE VIEW OrdersView AS SELECT * FROM Orders
WITH EXPRESSION MACROS(
    SUM(Revenue) – SUM(Cost) AS TotalProfit,
    EXPRESSION_MACRO(TotalProfit) / SUM(Cost) AS ProfitRate)
```

In some implementations, an EM can be referenced by another EM. For example:

```
SELECT EXPRESSION_MACRO(ProfitRate) FROM OrdersView
GROUP BY CustomerID
```

In this example, each customer's ProfitRate is obtained by:

```
SELECT EXPRESSION_MACRO(ProfitRate) FROM OrdersView
```

In some implementations, the alter syntax can be used to add or drop an EM to an existing view. For example, for add:

```
ALTER VIEW OrdersView ADD EXPRESSION
MACROS(EXPRESSION_MACRO(ProfitRate) * 100 AS
ProfitRateInPercentage)
```

For example, for drop:

```
ALTER VIEW OrdersView DROP EXPRESSION MACROS
(ProfitRateInPercentage)
```

In accordance with the present disclosure, EMs are implemented based on a query rewrite technique that performs adding, removing or modifying nodes within a raw parse tree provided from the parser. For example, if an EM is included in a query, the resulting raw parse tree includes an unknown node that represents the EM. The preprocessor replaces the unknown node within the raw parse tree with a consumable node to provide the consumable parse tree.

Figure 2:
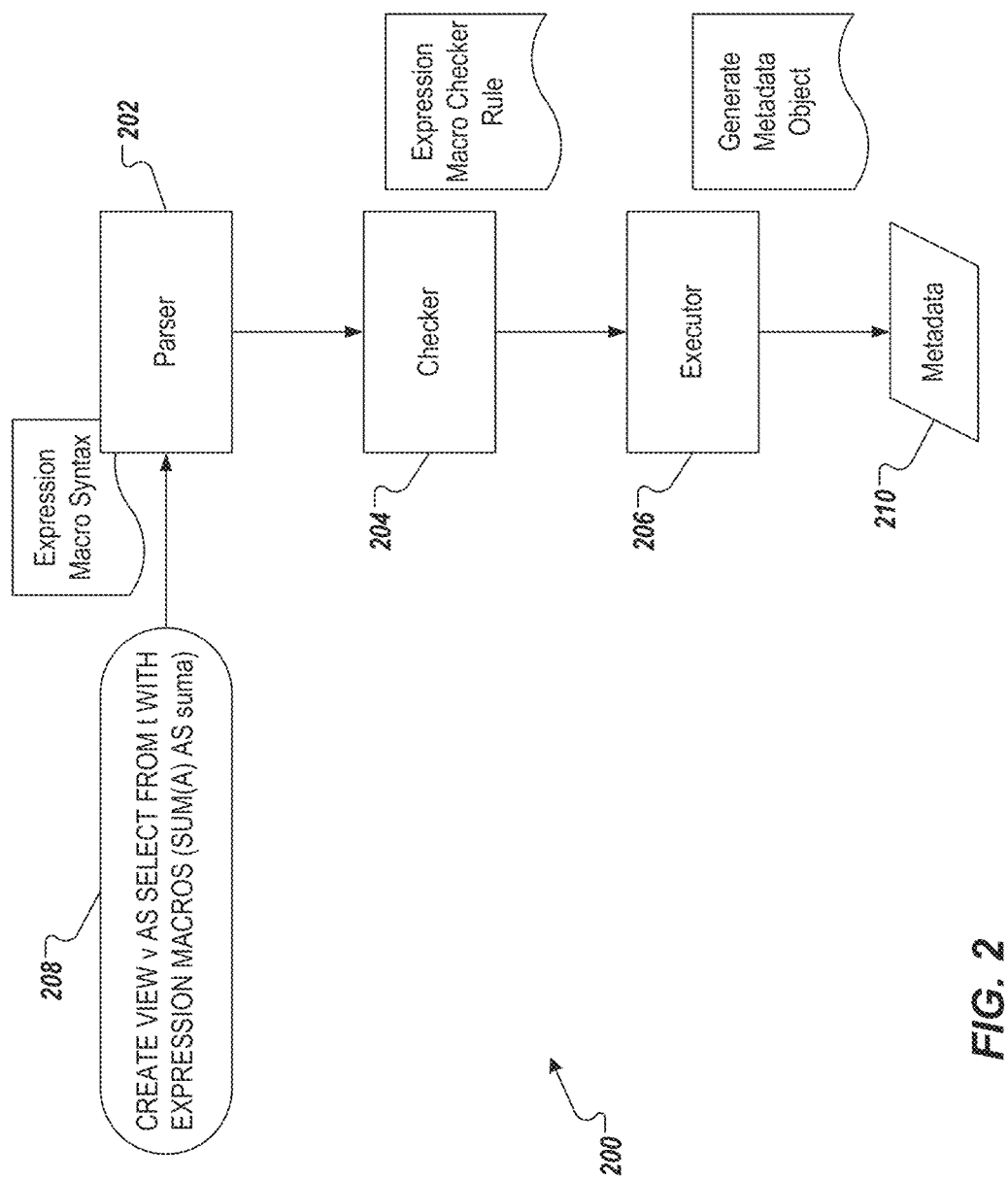
FIG. 2 depicts an example conceptual architecture in accordance with implementations of the present disclosure.

FIG. 2 depicts an example conceptual architecture 200 in accordance with implementations of the present disclosure. The example conceptual architecture 200 represents creation of a view using an EM. The example conceptual architecture 200 includes a parser 202, a checker 204, and an executor 206, each of which can be provided as one or more computer-executable programs. In some examples, a create statement 208 is processed to provide an EM and corresponding metadata 210. In the example of FIG. 2, the create statement is executed to create a view v as a selection from a table t with an EM that provides a function suma that sums values of column a within the table t.

In further detail, the parser 202 include the EM syntax, described above, in a grammar of the parser to support use of EMs in accordance with implementations of the present disclosure. In some examples, at least a portion of the grammar is provided as:

---
create_view : CREATE VIEW name AS select WITH EXPRESSION
MACROS '(' expression_macro_list ')'
expression_macro_list : expression_macro
    | expression_macro_list ',' expression_macro
expression_macro : expression AS alias
---

A data structure (e.g., ExpressionMacroInfo) is supported in the parser 202 for inclusion in a resulting parse tree and represents EM information. That is, the parser 202 processes the create statement 208 to generate corresponding EM information.

In some implementations, the data structure includes multiple fields. Example fields include a schema field (e.g., string schema), a view field (e.g., string view), a definition field (e.g., string definition), and a name field (e.g., string name). In some examples, the schema field provides a schema name of a view, in which a current schema name will be used if there is no explicit schema name in the create view statement. In some examples, the view field provides the view name of an EM. In some examples, the definition field provides one or more of a constant expression, aggregate function, scalar function, or a combination thereof. In some examples, the name field provides a reference for the EM.

In some implementations, the checker 204 receives the EM information and performs a semantic check of the underlying EM. The checker 204 blocks invalid usage of EMs. In this manner, invalid EMs are avoided, as they cannot be understood by subsequent components. Example invalid scenarios include, without limitation, duplicate EMs, references to non-existing EMs, and an invalid expression in definition.

If the EM information is valid, the executor 206 generates the metadata 210 for the underlying EM. In some implementations, the metadata 210 is provided as a metadata object that is specific to a valid EM. The metadata 210 is persistently stored in a database persistence layer (e.g., disk or other storage device). In this manner, the EM information can be searched (e.g., through searchable application programming interfaces (APIs)). For example, and as described in further detail herein, a data manipulation language (DML) statement can be executed to search the EM information (the metadata 210) during execution of a query. A non-limiting example interface for retrieving EM information from the persistence layer can include:

---
MetadataExpressionMacroInfo
---
string schema
string view
string definition
string name
static vector<const MetadataExpressionMacroInfo*>
searchByViewName(const char *schemaName, const char *viewName)
---

Example API Interface to Retrieve Metadata from Persistence Layer

Figure 3:
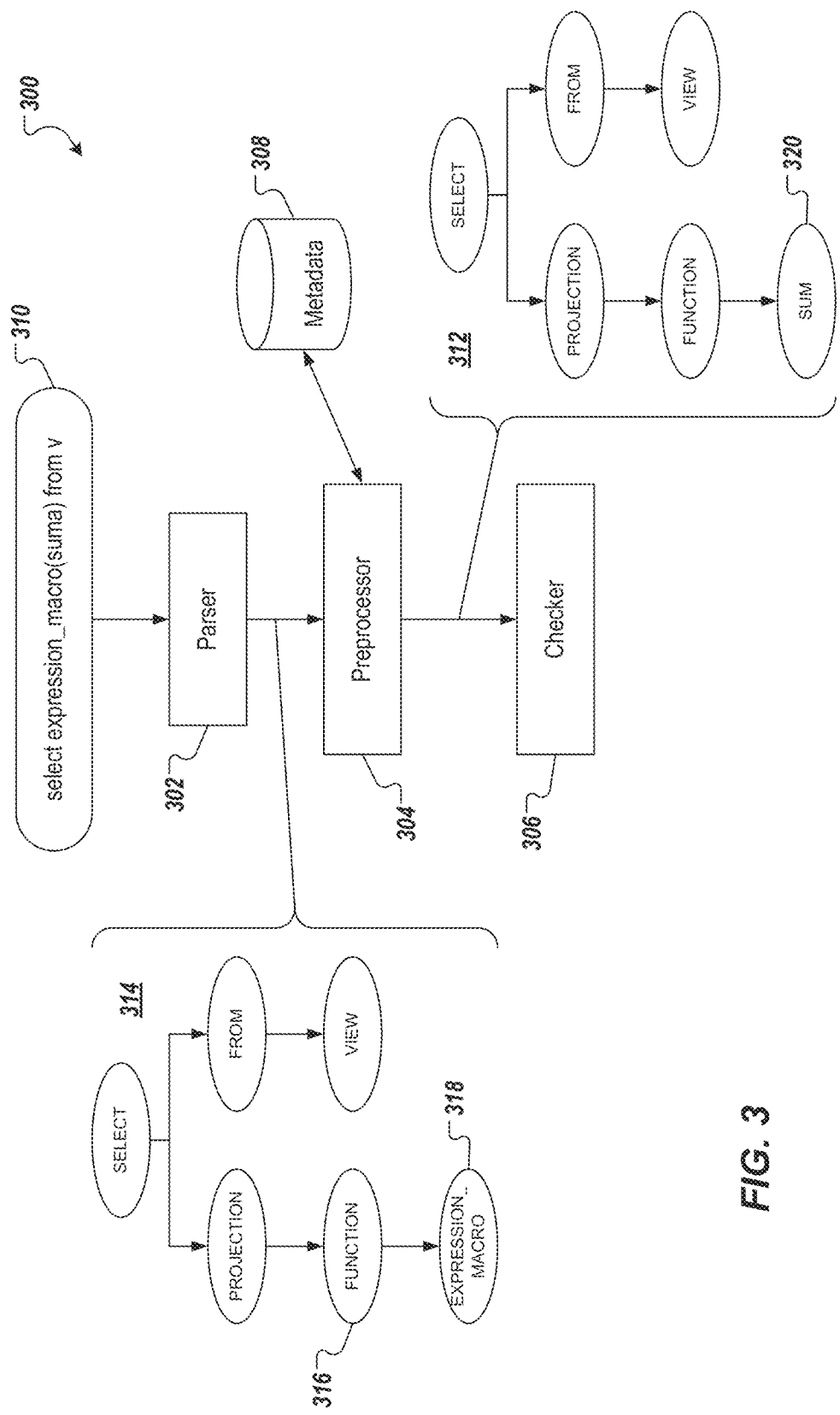
FIG. 3 depicts an example conceptual architecture in accordance with implementations of the present disclosure.

FIG. 3 depicts an example conceptual architecture 300 in accordance with implementations of the present disclosure.

The example conceptual architecture 300 represents execution of at least a portion of a query that include one or more EMs. The example conceptual architecture 300 includes a parser 302, a preprocessor 304, a checker 306, each of which can be provided as one or more computer-executable programs, and metadata 308 (e.g., stored in the persistence layer). In some examples, a query statement 310 is processed to provide a consumable parse tree 312, as described in further detail herein.

In the example of FIG. 3, the query includes a select statement to select an EM that includes the function suma from the view v. The parser 302 processes the query statement 310 to generate a raw parse tree 314. In the depicted example, the raw parse tree 314 includes a function node 316 and a node 318 corresponding to the EM of the query statement 310. In some examples, if multiple EMs are used in a query statement, a respective node is provided for each EM.

In further detail, the parser 302 parses the select statement into the raw parse tree 314. The raw parse tree 314 includes the function node 316 as a parent node of the node 318, which corresponds to the EM. This function, however, cannot be consumed by downstream components, because the function body of EXPRESSION_MACRO is meaningless. Furthermore, it is unnecessary to implement the function body of EXPRESSION_MACRO, because this function will be replaced by the EM's definition from the metadata 308, as described in further detail herein.

In some implementations, the preprocessor 304 receives the raw parse tree 314 and generates the consumable parse tree 312 based on the metadata 308. More particularly, the preprocessor 304 obtains the definition of the EXPRESSION_MACRO from the metadata 308. As described above, the EM information is stored in the persistence layer in the DDL phase. In some examples, the preprocessor obtains the metadata through the API interface provided above. For example, when calling the API, the view name and the view schema name are provided by the preprocessor 304 in a request and a metadata representative object is returned. The metadata representative object includes the definition string of the EM. In some implementations, the definition string of the EM is provided as a literal string. A new node 320 is generated based on the definition string and replaces the node 316 to provide the consumable parse tree 312.

As discussed above, an EM can be referenced by another EM. Consequently, after replacing a node (e.g., the node 316) with a new node (e.g., the node 320), it can be that further nodes are to be replaced. Consequently, repeated processing can be performed to recursively replace all of the EMs within the preprocessor 304.

Figure 4:
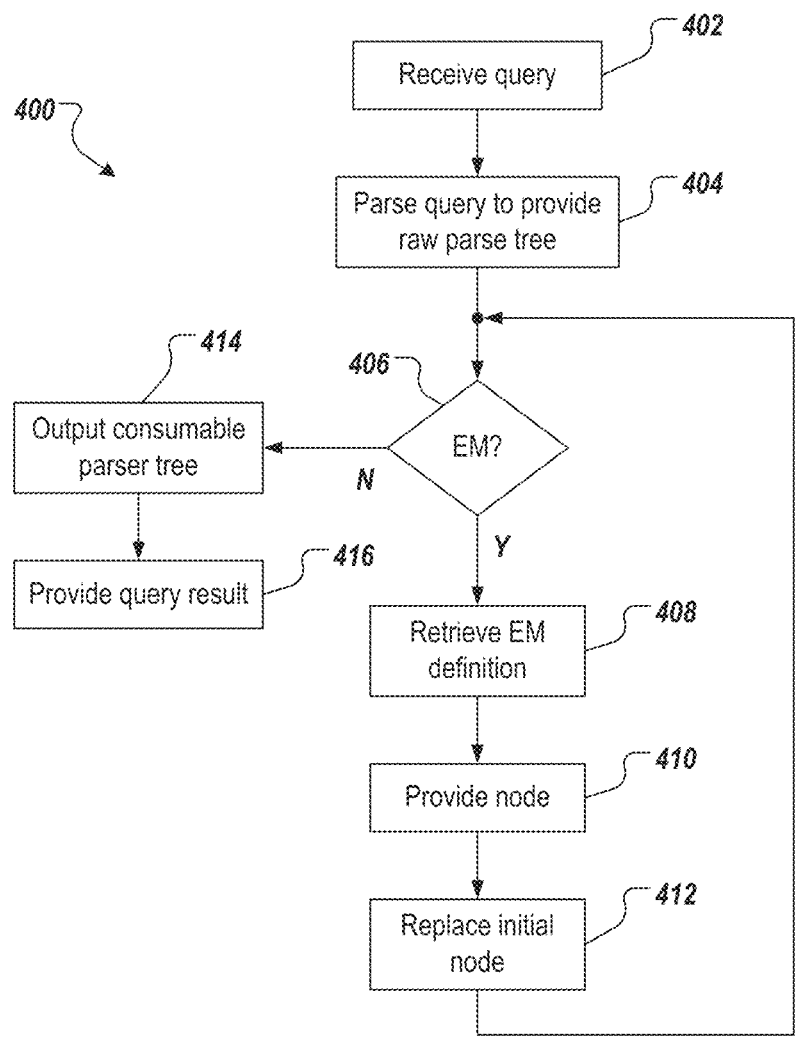
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 can be performed for resolving an incident associated with a software system.

A query is received (402). For example, a query is submitted to a database system. The query is parsed to provide a raw parse tree (404). For example, the parser 302 of FIG. 3 receives the query and parses the query to provide the raw parse tree 314. It is determined whether an EM is present (406). For example, the preprocessor 304 of FIG. 3 receives the raw parse tree 314 and determines whether the raw parse tree 314 includes any initial nodes representative of an EM, such as the node 318 depicted in FIG. 3.

If an EM is not present, a consumable parse tree is output (414) and a query result is provided (416). That is, if an EM is not present, the parse tree is a consumable parse tree that can be further processed to provide the query result. For example, a query execution plan (QEP) can be provided based on the consumable parse tree, the QEP providing a set of executable steps to access data within the database system in response to the query.

If an EM is present, a definition of the EM is retrieved (408). For example, the preprocessor 304 provides a request through an API to request metadata corresponding to the EM. The request includes a view name and a view schema name. A node is provided (410). For example, the preprocessor 304 receives metadata 308 corresponding to the EM and provides a node (e.g., the node 320) based on a definition of the EM provided within the metadata 308. An initial node is replaced (412) and the example process 400 loops back. For example, the preprocessor 304 replaces an initial node with one or more nodes (e.g., the node 320), at least one of the one or more nodes being a consumable. In some examples, the EM can itself include an EM (e.g., a nested EM). In such examples, the initial node is replaced with a node and another initial node that is representative of the nested EM. As described herein, the example process 400 can loop to recursively replace any initial node that is representative of an EM with a consumable node.

Figure 5:
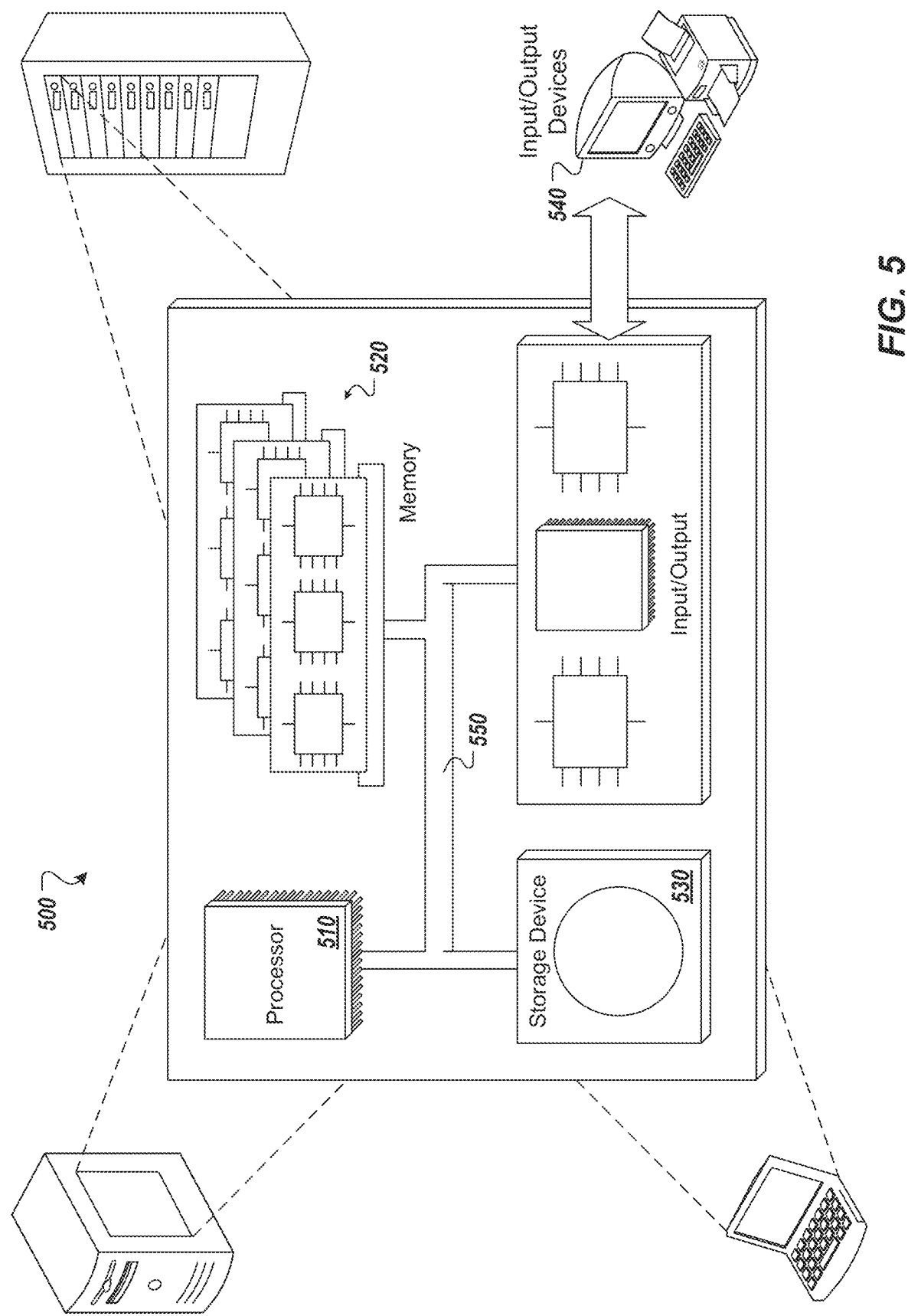
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a solid-state storage device, a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for querying a database system, the method comprising:
receiving, by a query parser of a database system, a query, the query comprising an expression macro (EM) that provides a function to be executed on values stored in the database system, the function defining a first order of operations to aggregate values before executing one or more calculations, the first order of operations being opposite to a second order of operations that would be executed absent the EM;
processing, by the query parser, the query to provide a raw parse tree, the raw parse tree comprising an initial node representative of the EM;
retrieving, by a preprocessor, metadata corresponding to the EM, the metadata comprising a definition string;
replacing, by the preprocessor, the initial node with a node based on the definition string to provide a consumable parse tree by executing a rewriting function to rewrite using the definition string of the metadata; and
executing the query within the database system using the consumable parse tree to provide a query result by executing the first order of operations to aggregate values then execute the one or more calculations within the database system.

2. The method of claim 1, wherein processing the query to provide a raw parse tree comprises parsing the query by the query parser, the query parser comprising an EM syntax that enables the query parser to generate the initial node as a data structure to represent the EM provided within the query.

3. The method of claim 1, wherein the metadata is retrieved from a metadata store through an application programming interface (API) based on a request comprising a view name and a view schema name.

4. The method of claim 1, wherein a preprocessor receives the raw parse tree from the query parser and replaces the initial node with the node to provide the consumable parse tree.

5. The method of claim 1, wherein the metadata is generated during a data definition language (DDL) phase and is stored in a persistence layer of the database system.

6. The method of claim 1, wherein the EM comprises at least one nested EM, the nested EM being represented by another initial node within the raw parse tree, the another initial node being replaced be another node based on a definition of the nested EM provided from metadata.

7. The method of claim 1, wherein executing the query comprises executing a query execution plan that is provided based on the consumable parse tree.

8. A non-transitory computer-readable storage medium coupled to one or more processors and having instructions stored thereon which, when executed by the one or more processors, cause the one or more processors to perform operations for querying a database system, the operations comprising:
   receiving, by a query parser of a database system, a query, the query comprising an expression macro (EM) that provides a function to be executed on values stored in the database system, the function defining a first order of operations to aggregate values before executing one or more calculations, the first order of operations being opposite to a second order of operations that would be executed absent the EM;
   processing, by the query parser, the query to provide a raw parse tree, the raw parse tree comprising an initial node representative of the EM;
   retrieving, by a preprocessor, metadata corresponding to the EM, the metadata comprising a definition string;
   replacing, by the preprocessor, the initial node with a node based on the definition string to provide a consumable parse tree by executing a rewriting function to rewrite using the definition string of the metadata; and
   executing the query within the database system using the consumable parse tree to provide a query result by executing the first order of operations to aggregate values then execute the one or more calculations within the database system.

9. The computer-readable storage medium of claim 8, wherein processing the query to provide a raw parse tree comprises parsing the query by the query parser, the query parser comprising an EM syntax that enables the query parser to generate the initial node as a data structure to represent the EM provided within the query.

10. The computer-readable storage medium of claim 8, wherein the metadata is retrieved from a metadata store through an application programming interface (API) based on a request comprising a view name and a view schema name.

11. The computer-readable storage medium of claim 8, wherein a preprocessor receives the raw parse tree from the query parser and replaces the initial node with the node to provide the consumable parse tree.

12. The computer-readable storage medium of claim 8, wherein the metadata is generated during a data definition language (DDL) phase and is stored in a persistence layer of the database system.

13. The computer-readable storage medium of claim 8, wherein the EM comprises at least one nested EM, the nested EM being represented by another initial node within the raw parse tree, the another initial node being replaced be another node based on a definition of the nested EM provided from metadata.

14. The computer-readable storage medium of claim 8, wherein executing the query comprises executing a query execution plan that is provided based on the consumable parse tree.

15. A system, comprising:
   one or more computers; and
   a computer-readable storage device coupled to the computing device and having instructions stored thereon which, when executed by the computing device, cause the computing device to perform operations for querying a database system, the operations comprising:
      receiving, by a query parser of a database system, a query, the query comprising an expression macro (EM) that provides a function to be executed on values stored in the database system, the function defining a first order of operations to aggregate values before executing one or more calculations, the first order of operations being opposite to a second order of operations that would be executed absent the EM;
      processing, by the query parser, the query to provide a raw parse tree, the raw parse tree comprising an initial node representative of the EM;
      retrieving, by a preprocessor, metadata corresponding to the EM, the metadata comprising a definition string;
      replacing, by the preprocessor, the initial node with a node based on the definition string to provide a consumable parse tree by executing a rewriting function to rewrite using the definition string of the metadata; and
      executing the query within the database system using the consumable parse tree to provide a query result by executing the first order of operations to aggregate values then execute the one or more calculations within the database system.

16. The system of claim 15, wherein processing the query to provide a raw parse tree comprises parsing the query by the query parser, the query parser comprising an EM syntax that enables the query parser to generate the initial node as a data structure to represent the EM provided within the query.

17. The system of claim 15, wherein the metadata is retrieved from a metadata store through an application programming interface (API) based on a request comprising a view name and a view schema name.

18. The system of claim 15, wherein a preprocessor receives the raw parse tree from the query parser and replaces the initial node with the node to provide the consumable parse tree.

19. The system of claim 15, wherein the metadata is generated during a data definition language (DDL) phase and is stored in a persistence layer of the database system.

20. The system of claim 15, wherein the EM comprises at least one nested EM, the nested EM being represented by another initial node within the raw parse tree, the another initial node being replaced be another node based on a definition of the nested EM provided from metadata.

* * * * *